(12) United States Patent
Hong et al.

(10) Patent No.: US 11,898,663 B2
(45) Date of Patent: Feb. 13, 2024

(54) PIPE CONNECTION APPARATUS

(71) Applicant: MEGAJOINT. CO., LTD., Seoul (KR)

(72) Inventors: Hyun-Guk Hong, Incheon (KR); Woong Hee Cho, Incheon (KR); Min Su Jegal, Incheon (KR)

(73) Assignee: MEGAJOINT. CO., LTD., Seoul (KR)

( * ) Notice: Subject to any disclaimer, the term of this patent is extended or adjusted under 35 U.S.C. 154(b) by 22 days.

(21) Appl. No.: 18/031,391

(22) PCT Filed: Oct. 12, 2021

(86) PCT No.: PCT/KR2021/014003
§ 371 (c)(1),
(2) Date: Apr. 12, 2023

(87) PCT Pub. No.: WO2022/080810
PCT Pub. Date: Apr. 21, 2022

(65) Prior Publication Data
US 2023/0287997 A1 Sep. 14, 2023

(30) Foreign Application Priority Data
Oct. 12, 2020 (KR) .......... 10-2020-0130845

(51) Int. Cl.
*F16L 13/14* (2006.01)
(52) U.S. Cl.
CPC .......... *F16L 13/141* (2013.01); *F16L 13/146* (2013.01)

(58) Field of Classification Search
CPC ....... F16L 13/14; F16L 13/141; F16L 13/146; F16L 13/165
See application file for complete search history.

(56) References Cited

U.S. PATENT DOCUMENTS

| 5,181,752 | A | * | 1/1993 | Benson | F16L 13/146 |
| 5,709,418 | A | * | 1/1998 | Benson | F16L 13/146 |
| 6,450,553 | B1 | * | 9/2002 | Suresh | F16L 13/146 |
| 7,503,595 | B2 | | 3/2009 | McKay | |
| 2011/0163536 | A1 | * | 7/2011 | Sindelar | F16L 13/146 |
| 2013/0270821 | A1 | * | 10/2013 | Haener | F16L 13/146 |
| 2017/0089496 | A1 | * | 3/2017 | Lennon | F16L 13/146 |
| 2018/0001571 | A1 | * | 1/2018 | Lennon | |

FOREIGN PATENT DOCUMENTS

| KR | 101365539 B1 | 2/2014 |
| KR | 101843159 B1 | 3/2018 |
| KR | 1020180075259 A | 7/2018 |
| KR | 101883492 B1 | 8/2018 |
| KR | 1020200002558 A | 1/2020 |
| KR | 102137995 B1 | 7/2020 |

* cited by examiner

*Primary Examiner* — William S. Choi
(74) *Attorney, Agent, or Firm* — Bridgeway IP Law Group, PLLC; Jihun Kim

(57) ABSTRACT

A pipe connection apparatus may include an outer body having a pipe mount part having a pipe insertion space opened rearward so that a pipe end is inserted into the pipe insertion space, and a swaging ring configured to come into contact with and press at least a part of the pipe mount part while surrounding at least a part of the pipe mount part.

9 Claims, 5 Drawing Sheets

PIPE CONNECTION APPARATUS

TECHNICAL FIELD

The present application relates to a pipe connection apparatus.

BACKGROUND ART

Because a pipe is easy to produce and has a structural advantage, the pipe is widely used as a part of piping or structures for transporting a fluid or the like without a leak. Methods of coupling the pipes include mechanical connection methods or welding/fusion methods.

Among the methods, the mechanical connection methods may be classified into a disassemblable (separable) coupling method and a permanent coupling method. Screwed joining and bolting using a flange, etc., provide disassemblable coupling of the former, and press bonding and swaging provide permanent coupling of the latter.

FIGS. 1A and 1B are cross-sectional views schematically illustrating states made before and after swaging is performed by a pipe connection apparatus in the related art.

Referring to FIGS. 1A and 1B, an apparatus in the related art configured to connect pipes on the basis of a swaging principle includes: a body 330 configured to cylindrically surround a predetermined region from ends of pipes 210 and 220; and swaging rings 310 and 320 configured to guide the body and decrease an outer diameter of the body while linearly moving in a longitudinal direction toward a central portion of the body 330.

The outer diameter of the body 330 is decreased by the movements of the swaging rings 310 and 320, and a gap between an inner surface of the body 330 and outer surfaces of the pipes 210 and 220 is removed, such that a leak of a fluid is prevented, and the pipes 210 and 220 are strongly fixed to the body 330.

The swaging-type coupling may ensure high reliability and coupling force in comparison with other mechanical connection methods, simplify the construction in comparison with welding/fusion methods, and facilitate quality control. Therefore, the swaging-type coupling is widely used.

In this regard, the present applicant has developed the patent invention disclosed in Korean Patent No. 10-2137995. The patent invention has been developed to provide a product (apparatus) in a state in which components are completely assembled. In the state in which the components are completely assembled, stress of an elastic region, which remains after plastic deformation, is applied to an inclined surface of a swaging ring and an inclined surface of an outer surface of an outer body. Therefore, there is a need for a solution to further increase a coupling force in the state in which the swaging ring and the outer body are assembled. In addition, even in the state in which the swaging is completed, a frictional force of a contact portion between the swaging ring and the outer surface of the outer body decreases after the swaging is completed in the same context. Therefore, there is a need for a solution to further increase a coupling force in the state in which the swaging is completed between the swaging ring and the outer body.

DISCLOSURE

Technical Problem

An object of the present application is to provide a pipe connection apparatus capable of minimizing contact between an inclined surface of a swaging ring and an inclined surface of an outer surface of a body and maintaining or increasing a coupling force, in a state in which components are completely assembled, and a coupling force, in a state in which swaging is completed, to a predetermined level or higher.

Technical Solution

As the technical means for solving the technical problem, a pipe connection apparatus according to one aspect of the present application may include: an outer body having a pipe mount part having a pipe insertion space opened rearward so that a pipe end is inserted into the pipe insertion space; and a swaging ring configured to come into contact with and press at least a part of the pipe mount part while surrounding at least a part of the pipe mount part, in which the pipe mount part includes: a first swaged portion having a first inner protruding portion; a second swaged portion having a second inner protruding portion and positioned to be spaced apart forward from the first swaged portion at an interval; a connection portion configured to connect the first swaged portion and the second swaged portion; a front extension portion extending forward from the second swaged portion; and a rear extension portion extending rearward from the first swaged portion and having a rear outer protruding portion, in which the swaging ring includes: a first ring portion having a first ring inner diameter larger than an outer diameter of the pipe end; a first tapered portion extending forward from a front end of the first ring portion so that an inner diameter thereof increases forward; a second ring portion positioned forward of the first tapered portion and having a second ring inner diameter larger than the first ring inner diameter; and a second tapered portion extending forward from a front end of the second ring portion so that an inner diameter thereof increases forward; and an inner groove portion configured to connect the first tapered portion and the second ring portion and recessed outward further than a front end of the first tapered portion and a rear end of the second ring portion, and in which the inner groove portion engages with the rear outer protruding portion to restrict a rearward movement of the swaging ring in a state in which components are completely assembled so that an inner peripheral surface of the second ring portion is in contact with an outer peripheral surface of the first swaged portion.

In the pipe connection apparatus according to an exemplary embodiment of the present application, the swaging ring may be provided so that the second tapered portion is not in contact with the outer body in the state in which the components are completely assembled.

The technical solution is just illustrative but should not be interpreted as being intended to limit the present application. In addition to the above-mentioned exemplary embodiment, additional exemplary embodiments may be present in the drawings and the detailed description of the present invention.

Advantageous Effects

According to the technical solution of the present application, the inner groove portion and the rear outer protruding portion engage with each other in the state in which the components are completely assembled, such that the coupling force between the swaging ring and the outer body is increased, which may prevent the separation of the swaging ring from the outer body in the state in which the components are completely assembled.

In addition, in case that the second tapered portion and the outer body are in contact with each other in the state in which the components are completely assembled, stress of the elastic region, which remains after the plastic deformation, is applied between the second tapered portion and the outer body, such that the separation force may be applied to the swaging ring rearward. However, according to the technical solution of the present application, the second tapered portion of the swaging ring may not come into contact with the outer body in the state in which the components are completely assembled, which makes it possible to prevent the separation force from being applied to the swaging ring rearward.

MODE FOR INVENTION

Figure 1A:
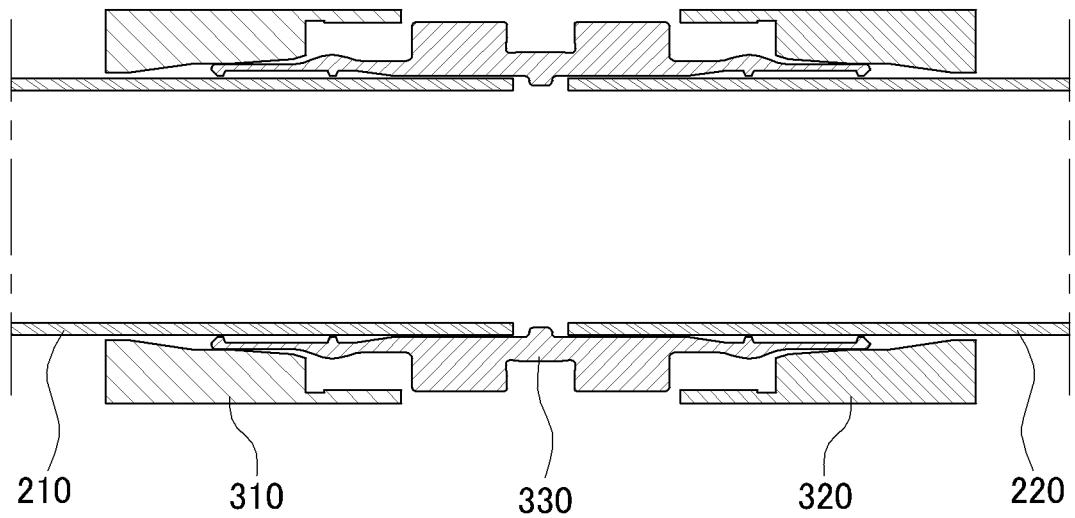
FIGS. 1A and 1B are cross-sectional views schematically illustrating states made before and after swaging is performed by a pipe connection apparatus in the related art.
Figure 1B:
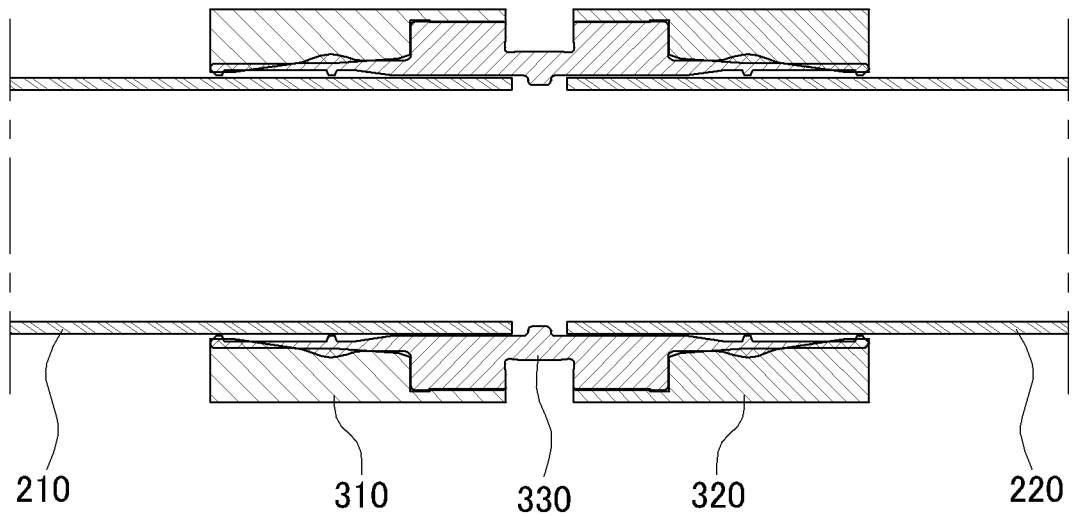

Hereinafter, embodiments of the present application will be described in detail with reference to the accompanying drawings so that those with ordinary skill in the art to which the present application pertains may easily carry out the embodiments. However, the present application may be implemented in various different ways, and is not limited to the embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "indirectly connected to" or "electrically connected to" the other element with other elements therebetween.

Throughout the specification of the present application, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

In addition, in the present application, a longitudinal direction of a pipe is defined and described as a forward/rearward direction. For example, based on FIG. 2, a 3 o'clock direction (a rightward direction) may be a forward direction, and a 9 o'clock direction (a leftward direction) may be a rearward direction. However, the longitudinal direction of the pipe does not depend only on the forward/rearward direction when the pipe is actually disposed. In other words, the pipe may be disposed not only in the forward/rearward direction, but also in various directions (e.g., an upward/downward direction, an oblique direction, or the like) in accordance with the necessity of arrangement of the pipe.

Hereinafter, a pipe connection apparatus according to an embodiment of the present application (hereinafter, referred to as 'the present pipe connection apparatus') will be described.

Figure 2:
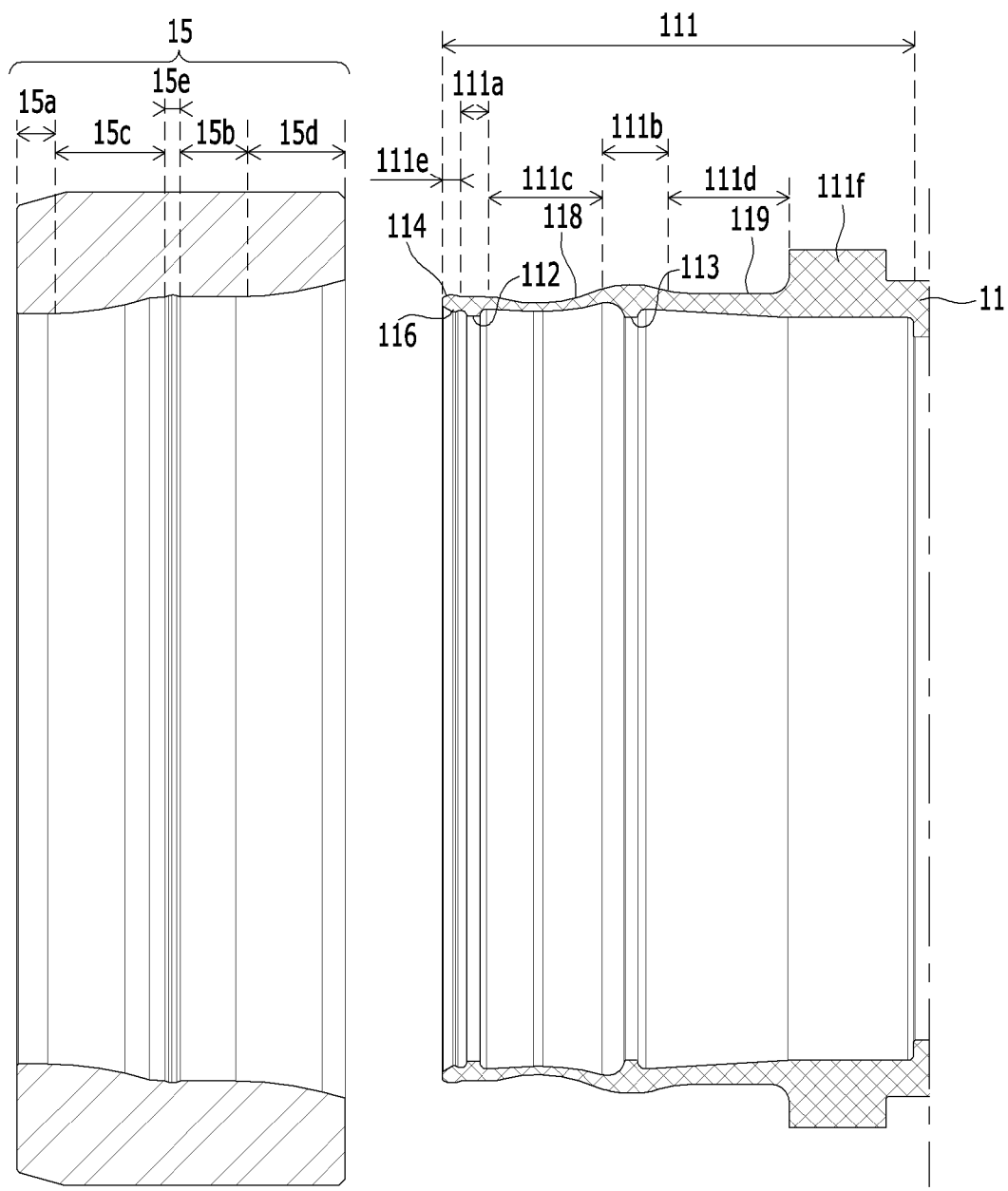
FIG. 2 is a schematic cross-sectional view of a pipe connection apparatus according to an embodiment of the present application before an assembling process.
Figure 3:
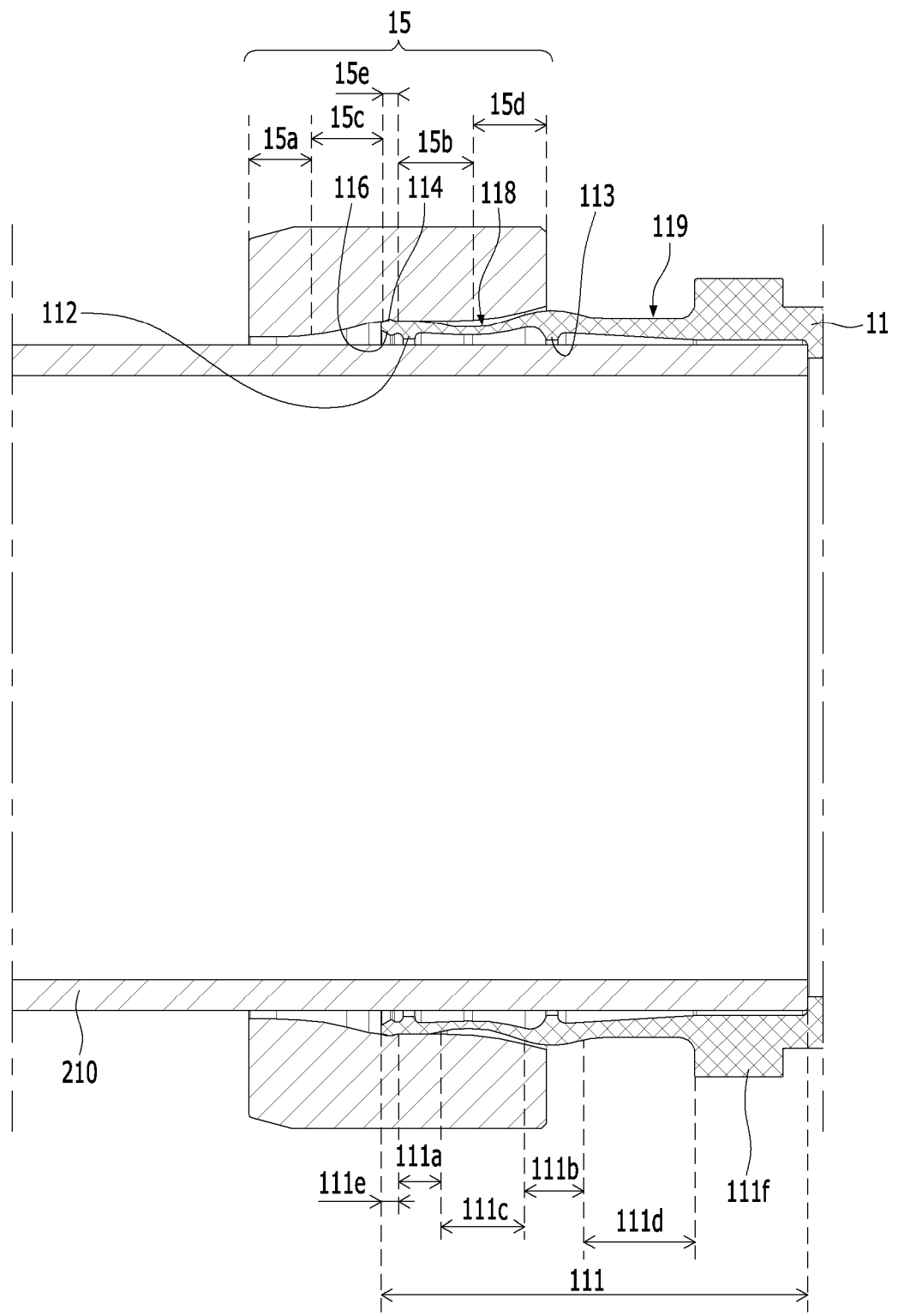
FIG. 3 is a schematic cross-sectional view illustrating the pipe connection apparatus according to the embodiment of the present application in a completely assembled state in which a pipe is inserted.
Figure 4:
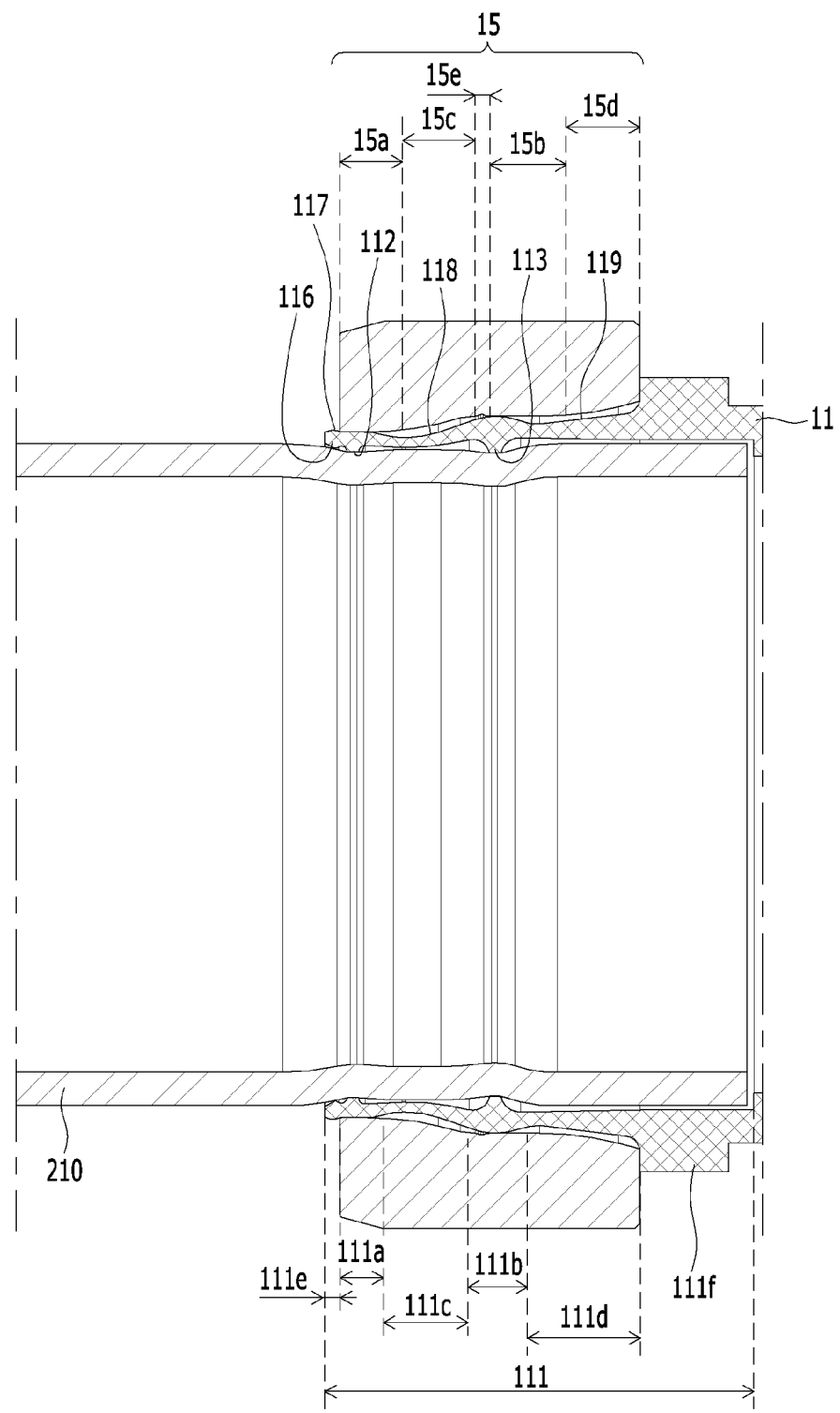
FIG. 4 is a schematic cross-sectional view of the pipe connection apparatus according to the embodiment of the present application in a state in which swaging is completed.

Referring to FIGS. 2 to 4, the present pipe connection apparatus includes an outer body 11. The outer body 11 has a pipe mount part 111 having a pipe insertion space opened rearward (in the 9 o'clock direction based on FIG. 2) so that an end of a pipe 210 is inserted into the pipe insertion space.

The pipe mount part 111 of the outer body 11 includes: a first swaged portion 111a having a first inner protruding portion 112 formed in the longitudinal direction (the 3 o'clock direction to the 9 o'clock direction based on FIG. 2); a second swaged portion 111b having a second inner protruding portion 113 and positioned to be spaced apart forward from the first swaged portion 111a at an interval; a connection portion 111c configured to connect the first swaged portion 111a and the second swaged portion 111b; and a front extension portion 111d extending forward from the second swaged portion 111b. In addition, the pipe mount part 111 includes a rear extension portion 111e extending rearward from the first swaged portion 111a and having a rear outer protruding portion 114. Referring to FIGS. 3 and 4, the outer body 11 may be disposed such that the rear extension portion 111e, the first swaged portion 111a, the second swaged portion 111b, the connection portion 111c, and the front extension portion 111d surround an end (front end) of the pipe 210.

In addition, a first swaging thickness, which is a thickness from an outer peripheral surface of the first swaged portion 111a to a protruding end of the first inner protruding portion 112, may be smaller than a second swaging thickness that is a thickness from an outer peripheral surface of the second swaged portion 111b to a protruding end of the second inner protruding portion 113.

The outer body 11 is configured to be pressed by a swaging ring 15 to be described below so that at least a part of the outer body 11 (the first swaged portion 111a and the second swaged portion 111b) is brought into (close) contact with an outer peripheral surface of the pipe 210 positioned in the outer body 11. The outer body 11 may mechanically connect the pipe 210 to another pipe while preventing a leak of a material in the pipe 210 and a separation (disconnection) of the pipe 210. To this end, the outer body 11 needs to have mechanical strength at a level equal to or higher than a level of that of the pipe 210.

In addition, referring to FIGS. 2 to 4, the present pipe connection apparatus may include the swaging ring 15 configured to surround at least a part of the pipe mount part 111 and come into contact with and press at least a part of the pipe mount part 111. The swaging ring 15 may be introduced from the rear extension portion 111e and swage at least a part of the outer body 11 while moving forward.

In addition, referring to FIGS. 2 and 3, the swaging ring 15 includes: a first ring portion 15a having a front end having a first ring inner diameter larger than an outer diameter of a pipe end; a first tapered portion 15c extending forward from the front end of the first ring portion 15a so that an inner diameter thereof increases forward; a second ring portion 15b positioned forward of the first tapered portion 15c and having a second ring inner diameter larger than the first ring inner diameter; and a second tapered portion 15d extending forward from a front end of the second ring portion 15b so that an inner diameter thereof increases forward. Therefore, an inner surface of the swaging ring 15 may have a shape in which an inner diameter thereof decreases rearward. Therefore, an outer surface of the outer body may be swaged so that an outer diameter of the outer body 11 decreases rearward by swaging performed by the forward movement of the swaging ring 15.

Referring to FIGS. 3 and 4, the swaging ring 15 surrounds at least a part of the pipe mount part 111 and comes into contact with and presses at least a part of the pipe mount part 111. This configuration will be specifically described below.

Figure 5:
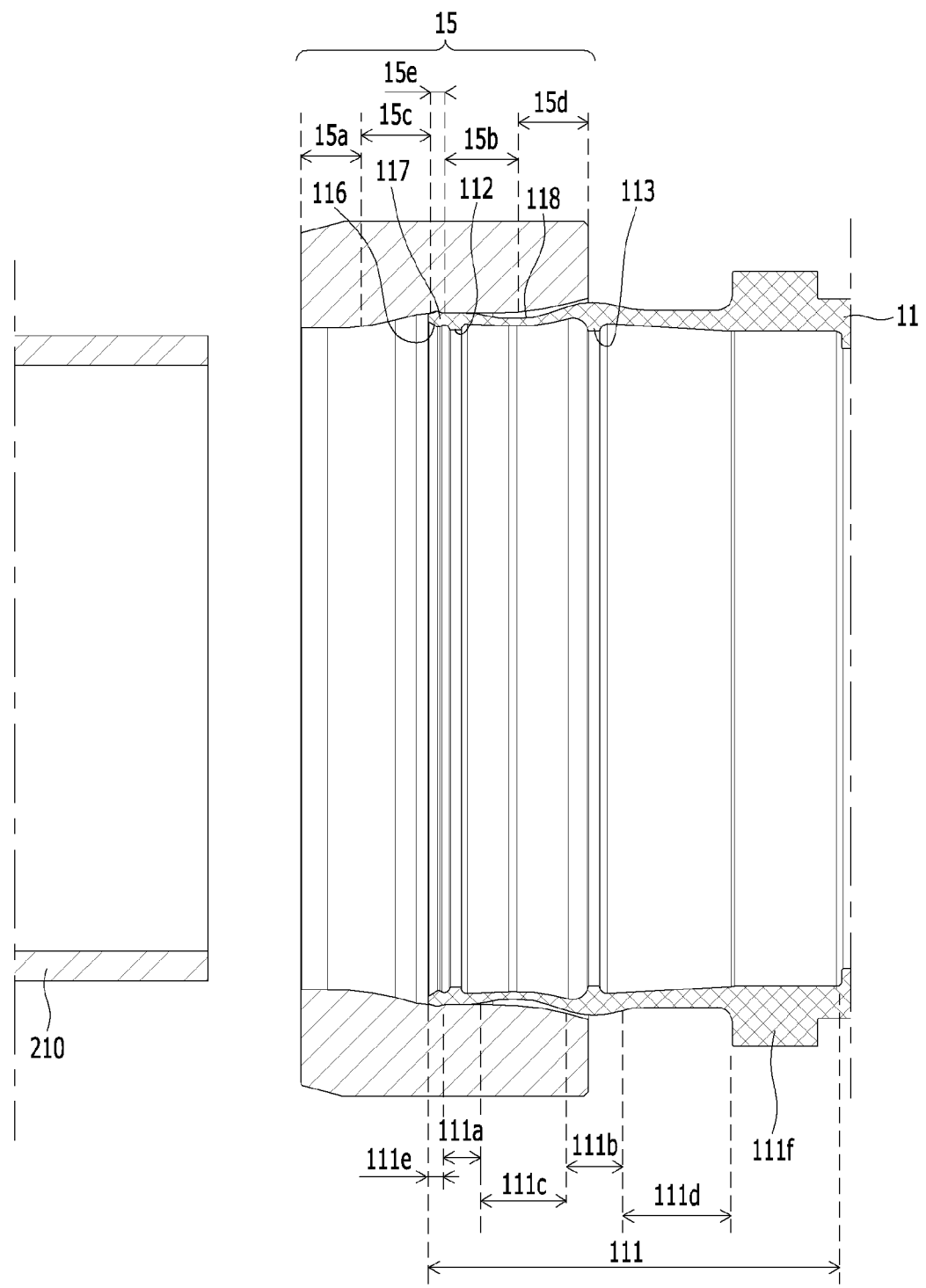
FIG. 5 is a schematic cross-sectional view illustrating the pipe connection apparatus according to the embodiment of the present application in a completely assembled state before the pipe is inserted.

Referring to the comparison between FIGS. 2 and 5, the swaging ring 15 may be introduced from the rear extension portion 111e and moved forward (a process of assembling the components of the swaging ring 15 and the outer body 11), such that the components may be completely assembled. Referring to FIG. 5, the state in which the components are completely assembled may mean a state in which an inner peripheral surface of the second ring portion 15b is in contact with an outer peripheral surface of the first swaged portion 111a.

For reference, referring to FIG. 2, in a non-assembled state made before the swaging ring 15 is assembled to the outer body 11, an outer diameter of the first swaged portion 111a or an outer diameter of at least a part of the connection portion 111c may be equal to or larger than the second ring inner diameter. For example, the outer diameter of the first swaged portion 111a may be equal to the second ring inner diameter, and at least a part of the connection portion 111c (e.g., a front end of the connection portion 111c) may have a diameter equal to or larger than the second ring inner diameter. Therefore, during the process of assembling the components of the swaging ring 15 and the outer body 11, the second ring portion 15b may plastically deform at least a part of the first swaged portion 111a or at least a part of the connection portion 111c. At least a part of the first swaged portion 111a or at least a part of the connection portion 111c may be deformed in a direction in which an outer diameter thereof decreases. In addition, in the state in which the components are completely assembled, the process in which the swaging ring 15 comes into contact with and presses the outer body 11 may be performed on the first swaged portion 111a or at least a part of the connection portion 111c (e.g., a part of a front or rear edge of a first groove portion 118 in case that the first groove portion 118 is a groove shape having a recessed depth that gradually increases, as can be seen from the drawings).

In addition, referring to FIGS. 3 and 5 together, a second protruding inner diameter of the protruding end of the second inner protruding portion 113 and a first protruding inner diameter of the protruding end of the first inner protruding portion 112 may each be equal to or larger than the outer diameter of the pipe end (e.g., a maximum acceptable outer diameter of the pipe end) so that the end of the pipe 210 may be inserted into the pipe insertion space in the state in which the components are completely assembled. Therefore, the pipe end may be inserted into the swaging ring 15 and the outer body 11 in the state in which the components are completely assembled. For example, the second protruding inner diameter of the protruding end of the second inner protruding portion 113 (a maximum inner diameter of the inner surface of the second inner protruding portion 113) and an inner diameter made by decreasing the second ring inner diameter by twice the first swaging thickness (a maximum inner diameter of the inner surface of the first inner protruding portion 112 in the state in which the inner peripheral surface of the second ring portion 15b is in contact with the outer peripheral surface of the first swaged portion 111a) may each be equal to or larger than the outer diameter of the pipe end (the maximum acceptable outer diameter of the pipe end).

In addition, with the above-mentioned configuration, before the components are assembled, the second protruding inner diameter of the protruding end of the second inner protruding portion 113 may be equal to or larger than the maximum acceptable outer diameter of the pipe end so that the pipe end may be inserted.

In addition, for reference, referring to FIG. 4, a second taper start inner diameter of the front end of the second tapered portion 15d may be equal to or larger than the maximum outer diameter of the pipe mount part 111. Therefore, the swaging ring 15 may be easily introduced into the outer body 11 (in other words, the assembling of the components may be easily started).

In addition, a protruding outer diameter of the protruding end of the rear outer protruding portion 114 may be smaller than the second taper start inner diameter of the front end of the second tapered portion 15d. Therefore, the swaging ring 15 may be more easily introduced into the outer body 11 (in other words, the assembling of the components may be more easily started) in comparison with the case in which the protruding outer diameter of the rear outer protruding portion 114 is equal to or larger than the second taper start inner diameter of the front end of the second tapered portion 15d.

In addition, referring to FIG. 3, the first protruding inner diameter may be equal to or larger than the second protruding inner diameter in the state in which the components are completely assembled. For example, in the state in which the components are completely assembled, the first protruding inner diameter of the protruding end of the first inner protruding portion 112 may be equal to or larger than a value made by adding a difference between the outer diameter of the rear outer protruding portion 114 and the inner diameter of the second ring portion 15b (a minimum inner diameter of the second tapered portion 15d) to the second protruding inner diameter of the protruding end of the second inner protruding portion 113.

In addition, the swaging ring 15 may include an inner groove portion 15e that connects the first tapered portion 15c and the second ring portion 15b and is recessed outward from a front end of the first tapered portion 15c and a rear end of the second ring portion 15b.

The inner groove portion 15e engages with the rear outer protruding portion 114 in the state in which the components are completely assembled (the state in which the inner peripheral surface of the second ring portion 15b is in contact with the outer peripheral surface of the first swaged portion 111a). Therefore, a rearward movement of the swaging ring 15 may be restricted in the state in which the components are completely assembled. In other words, in the state in which the components are completely assembled, the inner groove portion 15e and the rear outer protruding portion 114 engage with each other, and contact stress occurs between the inner surface of the inner groove portion 15e and the outer surface of the rear outer protruding portion 114, such that the swaging ring 15 and the outer body 11 may be coupled strongly.

To this end, the protruding outer diameter of the protruding end of the rear outer protruding portion 114 may have a value larger than the minimum inner diameter of the second tapered portion 15d of the swaging ring 15 (the inner diameter of the second ring portion 15b) and smaller than the inner diameter (recessed inner diameter) of the inner groove portion 15e of the swaging ring 15 so that the rear outer protruding portion 114 is assembled by being caught by the inner groove portion 15e in the state in which the components are completely assembled.

In addition, referring to FIG. 4, a swaging completion state may be implemented as the swaging ring 15 further moves forward (swaging process) in the state in which the components are completely assembled. The swaging completion state may mean a state in which the inner peripheral surface of the first ring portion 15a is in contact with the outer peripheral surface of the first swaged portion 111a and the inner peripheral surface of the second ring portion 15b is in contact with the outer peripheral surface of the second swaged portion 111b. During the swaging process, the second tapered portion 15d or the second ring portion 15b may plastically deform at least a part of the second swaged portion 111d, and the first tapered portion 15c or the first ring portion 15a may plastically deform at least a part of the first swaged portion 111a. In the swaging completion state, the process in which the swaging ring 15 comes into contact with and presses the outer body 11 may be performed on the first swaged portion 111a and the second swaged portion 111b. In addition, as necessary, in the swaging completion state, the process in which the swaging ring 15 comes into contact with and presses the outer body 11 may be performed on at least a part of the connection portion 111c and at least a part of the extension portion 111d. Therefore, the second swaged portion 111b may be deformed in the direction in which the outer diameter thereof decreases. For example, the second swaged portion 111b may come into contact with the pipe 210 as the outer diameter thereof decreases by a difference between the inner diameter of the front end of the swaging ring 15 and the inner diameter of the portion of the swaging ring 15 (e.g., the second ring portion 15b) that is in contact with the inner surface of the second swaged portion 111b in the swaging completion state. In addition, during the process of assembling the components, the first swaged portion 111b may be deformed in the direction in which the outer diameter thereof decreases. For example, the first swaged portion 111b may come into contact with the pipe 210 as the outer diameter thereof decreases by a difference in inner diameter between the first ring portion 15a and the second ring portion 15b (a difference between the first ring inner diameter and the second ring inner diameter). Therefore, at least a part of the first swaged portion 111a and at least a part of the connection portion 111c may be primarily decreased in outer diameter (a predetermined amount of decrease in outer diameter) by the second ring portion 15b and at least a part of the second tapered portion 15d to be described below during the process of assembling the components. During the swaging process, the outer diameter may be finally decreased by the first ring portion 15a and at least a part of the first tapered portion 15c to be described below.

In addition, the outer diameter of the first swaged portion 111a (e.g., a predetermined outer diameter of a portion having a predetermined outer diameter to be described below) may have the same value as the minimum inner diameter of the second tapered portion 15d of the swaging ring 15 (a type of inner diameter, the inner diameter of the second ring portion 15b) so that the first swaged portion 111a may serve as a guide that allows the swaging ring 15 to move forward in parallel with an axial direction through surface contact between the first swaged portion 111a and the swaging ring 15 during the swaging process after the components are completely assembled.

For reference, an interval between the first swaged portion 111a and the second swaged portion 111b may be set to an interval that allows the inner peripheral surface of the second ring portion 15b to come into contact with the outer peripheral surface of the second swaged portion 111b when the inner peripheral surface of the first ring portion 15a comes into contact with the outer peripheral surface of the first swaged portion 111a so that the inner peripheral surface of the second ring portion 15b comes into contact with the outer peripheral surface of the second swaged portion 111b when the inner peripheral surface of the first ring portion 15a comes into contact with the outer peripheral surface of the first swaged portion 111a in the swaging completion state.

In addition, during the swaging process, contact stress occurs between the inner surface of at least a part of the swaging ring 15 (the second ring portion 15b and the second tapered portion 15d to be described below) and the outer surface of at least a part of the outer body 11 (the second swaged portion 111b and the extension portion 111d), and contact stress occurs between the inner surface of another part of the swaging ring 15 (the first ring portion 15a and the first tapered portion 15c to be described below) and the outer surface of another part of the outer body 11 (at least a part of the first swaged portion 111a and the connection portion 111c), such that the swaging ring 15 and the outer body 11 may be coupled strongly in the state in which the components are completely assembled.

In addition, referring to FIG. 4, the decreased first ring inner diameter of the first ring portion 15a and the decreased second ring inner diameter of the second ring portion 15b may each be smaller than the outer diameter of the pipe end so that the first inner protruding portion 112 and the second inner protruding portion 113 may come into contact with and press the outer peripheral surface of the pipe end in the swaging completion state. Specifically, an inner diameter, which is made by decreasing the first ring inner diameter of the first ring portion 15a by twice the first swaging thickness, and an inner diameter, which is made by decreasing the second ring inner diameter of the second ring portion 15b by twice the second swaging thickness, may each be smaller than the outer diameter of the pipe end so that the first inner protruding portion 112 and the second inner protruding portion 113 may come into contact with and press the outer peripheral surface of the pipe end in the swaging completion state. Therefore, the second swaged portion 111b may come into contact with and press the pipe end in the swaging completion state by being deformed in the direction in which the outer diameter thereof is decreased by swaging by the second ring portion 15b, and the first swaged portion 111a may come into contact with and press the pipe end in the swaging completion state by being deformed in the direction in which the outer diameter thereof is decreased by swaging by the first ring portion 15a.

According to the above-mentioned description, the swaging may be performed on the outer body 11 when the pipe 210 is inserted and the swaging ring is moved so that the inner peripheral surface of the second ring portion 15b comes into contact with the outer peripheral surface of the second swaged portion 111b in the state in which the components are completely assembled and the inner peripheral surface of the second ring portion 15b is in contact with the outer peripheral surface of the first swaged portion 111a. Therefore, a distance by which the swaging ring 15 needs to move to perform the swaging may be decreased in comparison with the related art. Therefore, the pipe connection apparatus having a shorter length than that in the related art may be implemented, and a weight and size of a fastening tool for swaging may be reduced, such that the swaging may be easily performed.

In addition, according to the technical solution of the present application, as the swaging ring 15 just moves forward to a middle portion of the outer body 11, the ends of the two pipes 210 are connected to each other by being swaged while ensuring predetermined mechanical strength, which makes it possible to implement the pipe connection apparatus advantageous in that the processing time is shortened.

In addition, referring to FIGS. 3 and 5, the swaging ring 15 may be provided so that the second tapered portion 15d is not in contact with the outer body 11 in the state in which the components are completely assembled. Therefore, in the state in which the components are completely assembled, the second tapered portion 15d and the outer body 11 are not in contact with each other, which makes it possible to prevent the occurrence of a force in a direction in which the swaging ring 15 is separated (deviates from the outer body 11 (e.g., rearward)), which may occur between the second tapered portion 15d and the outer body 11 in the state in which the components are completely assembled.

In addition, the connection portion 111c may have the first groove portion 118. The first groove portion 118 is recessed so as not to be in contact with the second tapered portion 15d in the state in which the components are completely assembled. The first groove portion 118 is recessed so as not to be in contact with the first tapered portion 15c in the swaging completion state (in the state in which the inner peripheral surface of the first ring portion 15a is in contact with the outer peripheral surface of the first swaged portion 111a and the inner peripheral surface of the second ring portion 15b is in contact with the outer peripheral surface of the second swaged portion 111b). The first groove portion 118 may have a shape recessed inward. In addition, the first groove portion 118 may be formed to correspond to a pressing region of at least a part of the second tapered portion 15d in the state in which the components are completely assembled. For example, the first groove portion 118 may be formed to face at least a part of the second tapered portion 15d in an inward/outward direction in the state in which the components are completely assembled. In addition, the first groove portion 118 may be formed to correspond to a pressing region of at least a part of the first tapered portion 15c in the swaging completion state. For example, the first groove portion 118 may face at least a part of the first tapered portion 15c in the inward/outward direction in the swaging completion state. In addition, an outer diameter of a part of the first groove portion 118 may be smaller than the minimum inner diameter of the second tapered portion 15d.

According to the first groove portion 118, the first groove portion 118 and the second tapered portion 15d are not in contact with each other in the state in which the components are completely assembled, which makes it possible to prevent the occurrence of a force in the direction in which the swaging ring 15 is separated (deviates from the outer body 11 (e.g., rearward)).

That is, according to the present pipe connection apparatus, the rearward movement of the swaging ring 16 is restricted by the configuration in which the inner groove portion 15e and the rear outer protruding portion 114 engage with each other in the state in which the components are completely assembled, and the occurrence of an external force (separation force), which separates the swaging ring 15 from the outer body 11, is prevented (inhibited) by the configuration in which the first groove portion 118 and the second tapered portion 15d are not in contact with each other. Therefore, it is possible to more securely maintain the fastened state of the swaging ring 15 and the outer body 11 in the state in which the components are completely assembled.

In addition, referring to FIG. 4, the first groove portion 118 may not be in contact with the first tapered portion 15c in the swaging completion state. Therefore, because the first groove portion 118 and the first tapered portion 15c are not in contact with each other in the swaging completion state, the force may not occur in the direction in which the swaging ring 15 is separated (deviates from the outer body 11 (e.g., rearward)).

In addition, even though the first groove portion 118 is not in direct contact with the swaging ring 15, a slight decrease in outer diameter may occur because of an influence of the plastic deformation made by the first tapered portion 15a of the swaging ring 15 during the swaging process. Therefore, the first groove portion 118 may be deformed without coming into contact with the first tapered portion 15c after the swaging is completed.

In addition, referring to FIG. 4, the front extension portion 111d may have a second groove portion 119 recessed so as not to be in contact with the second tapered portion 15d in the swaging completion state. The second groove portion 119 may be formed to correspond to the pressing region of at least a part of the second tapered portion 15d in the swaging completion state. For example, the second groove portion 119 may face at least a part of the second tapered portion 15d in the inward/outward direction in the swaging completion state.

According to the second groove portion 119, the second groove portion 119 and the second tapered portion 15d are not in contact with each other in the swaging completion state, which makes it possible to prevent the occurrence of the force in the direction in which the swaging ring 15 is separated (deviates from the outer body 11 (e.g., rearward)).

In addition, even though the second groove portion 119 is not in direct contact with the swaging ring 15, a slight decrease in outer diameter may occur because of an influence of the plastic deformation made by the second tapered portion 15d of the swaging ring 15 during the swaging process. Therefore, the second groove portion 119 may be deformed without coming into contact with the second tapered portion 15d after the swaging is completed.

According to the present pipe connection apparatus, in the swaging completion state, the first groove portion 118 and the first tapered portion 15c are not in contact with each other, and the second groove portion 119 and the second tapered portion 15d are not in contact with each other, which makes it possible to decrease an external force that may occur in the direction in which the swaging ring 15 is separated (deviates from the outer body 11 (e.g., rearward)) in the swaging completion state.

For reference, referring to FIGS. 2 and 3, the second groove portion 119 may include a section in which a predetermined outer diameter is defined in a forward/rearward direction before the swaging completion state. The outer diameter of the section having the predetermined outer diameter may be smaller than a maximum inner diameter of the second tapered portion 15*d*. In addition, referring to FIG. 2, the section, which has the predetermined outer diameter in the forward/rearward direction before the swaging, may have the outer diameter larger than the minimum inner diameter of the second tapered portion 15*d*. Therefore, during the swaging process, at least a part of the second groove portion 118 may be deformed by axial pressure applied by the second tapered portion 15*d*.

In addition, referring to FIG. 4, in the swaging completion state, the first groove portion 118 and the first tapered portion 15*b* are not in contact with each other, and the second groove portion 119 and the second tapered portion 15*d* are not in contact with each other, such that in the swaging completion state, a degree to which the swaging 15 presses the connection portion 111*c* and the front extension portion 111*d* may decrease in comparison with the case in which the first groove portion 118 and the first tapered portion 15*b* are in contact with each other, and the second groove portion 119 and the second tapered portion 15*d* are in contact with each other. Therefore, in the swaging completion state, the present pipe connection structure and the pipe 210 may be fastened as the first swaged portion 111*a* and the second swaged portion 111*b* just press the pipe 210. Therefore, during the swaging process, the process in which the swaging ring 15 applies a high external force to the connection portion 111*c* and the front extension portion 111*d* may not be necessary. Because the first and second groove portions 118 and 119 are recessed, it is possible to prevent the swaging ring 15 from applying an excessive external force to the connection portion 111*c* and the front extension portion 111*d*. That is, the first and second groove portions 118 and 119 may serve to prevent the unnecessary application of the external force to the outer body 11 and the unnecessary plastic deformation of the outer body 11 by the swaging ring (by at least a part of the first ring portion 15*a* or at least a part of the first tapered portion 15*c* in the case of the first groove portion 118 and by at least a part of the second ring portion 15*b* or at least a part of the second tapered portion 15*d* in the case of the second groove portion 119) at a point in time at which the swaging is completed. In addition, to improve the effects implemented by the first and second groove portions 118 and 119, as necessary, the first groove portion 118 in the swaging completion state may be formed so that at least a part of the first groove portion 118 corresponds to at least a part of the pressing region of the first ring portion 15*a*, and the second groove portion 119 in the swaging completion state may be formed so that at least a part of the second groove portion 119 corresponds to at least a part of the pressing region of the second ring portion 15*b*.

In addition, referring to FIG. 4, the rear outer protruding portion 114 may be formed at a position that serves as a restriction projection that restricts the rearward movement of the swaging ring 15 in the swaging completion state. For example, the rear outer protruding portion 114 may be positioned rearward of the swaging ring 15 in the swaging completion state. In addition, in the swaging completion state, the protruding outer diameter of the protruding end of the rear outer protruding portion 114 may be larger than the inner diameter of the first ring portion 15*a* of the swaging ring 15. Therefore, in the swaging completion state, the rear outer protruding portion 114 may be disposed rearward of the swaging ring 15, support the swaging ring 15, and restrict the rearward movement of the swaging ring 15.

In addition, referring to FIG. 4, the pipe mount part 111 may include a restriction projection portion 111*f* formed forward of the front extension portion 111*d* and configured to restrict a forward movement of the swaging ring 15 in the swaging completion state. For example, a rear surface of the restriction projection portion 111*f* may be formed as a vertical surface. In addition, an outer diameter of the restriction projection portion 111*f* may be larger than the inner diameter of the swaging ring 15 (the inner diameter of the second tapered portion 15*d*). Therefore, in the swaging completion state, the swaging ring 15 may be positioned between the restriction projection portion 111*f* and the rear outer protruding portion 114, such that the movement of the swaging ring 15 in the forward/rearward direction may be restricted. Therefore, strong fastening may be implemented because the movement of the swaging ring 15 in the forward/rearward direction is restricted.

For reference, an interval between the rear outer protruding portion 114 and the restriction projection portion 111*f* may be set to an interval, which may restrict the movement of the swaging ring 15 in the forward/rearward direction, for example, a value corresponding, within an error range, to a length of the swaging ring 15 in the forward/rearward direction (or a value equal to the length of the swaging ring 15 in the forward/rearward direction) so that the movement of the swaging ring 15 in the forward/rearward direction is restricted by the restriction projection portion 111*f* and the rear outer protruding portion 114 in the swaging completion state. Therefore, the separation of the swaging ring 15 may be prevented.

That is, according to the present pipe connection apparatus, in the swaging completion state, the rear outer protruding portion 114 may be provided in the form of a catching projection and fastened by being caught by a rear end of the swaging ring 15, and the front end of the swaging ring 15 comes into contact with a vertical surface of the outer body 11 (the vertical surface of the restriction projection portion 1110, which makes it possible to more securely maintain the swaging completion state.

In addition, the rear extension portion 111*e* may have an auxiliary inner protruding portion 116. At least a part of the auxiliary inner protruding portion 116 may be formed to correspond to at least a part of the rear outer protruding portion 114 in the inward/outward direction. In addition, referring to FIGS. 3 and 4, the auxiliary inner protruding portion 116 may be provided such that a protruding inner diameter of a protruding end of the auxiliary inner protruding portion 116 is smaller than the protruding inner diameter of the protruding end of the first inner protruding portion 112 in the state in which the components are completely assembled. Therefore, in the state in which the components are completely assembled, the protruding inner diameter of the auxiliary inner protruding portion 116 may be larger than the outer diameter of the end of the pipe 210, and the auxiliary inner protruding portion 116 does not interfere with the outer peripheral surface of the end of the pipe 210. Therefore, the pipe 210 may be inserted into the outer body 11 in the state in which the components are completely assembled. In addition, as described below, in the state in which the components are completely assembled, the protruding inner diameter of the auxiliary inner protruding portion 116 is smaller than the protruding inner diameter of the first inner protruding portion 112, such that the outward protrusion of the rear outer protruding portion 114 may become clearer.

In addition, for reference, referring to FIG. 2, the protruding inner diameter of the auxiliary inner protruding portion 116 may be smaller than the protruding inner diameter of the first inner protruding portion 112 before the components are assembled.

In addition, the auxiliary inner protruding portion 116 may provide an elastic restoring force that allows a rear outer protruding portion 115 to more clearly further protrude outward than the inner peripheral surface of the first ring portion 15a in comparison with the case in which the auxiliary inner protruding portion 116 is not formed in the swaging completion state.

Referring to FIG. 4, the auxiliary inner protruding portion 116 may be positioned rearward of the swaging ring 15 in the swaging completion state. In addition, during the swaging process, in an initial state in the auxiliary inner protruding portion 116 does not interfere with the outer peripheral surface of the end of the pipe 210, the auxiliary inner protruding portion 116 may be deformed by an axial compressive force applied by the first tapered portion 15c or the first ring portion 15a into a contact state in which the auxiliary inner protruding portion 116 comes into contact with or presses the outer peripheral surface of the end of the pipe 210. The rear outer protruding portion 114 may be formed on an outer surface of the rear extension portion 111e on which the auxiliary inner protruding portion 116 is formed. The protruding outer diameter of the protruding end of the rear outer protruding portion 114 (a maximum outer diameter of the rear extension portion 111e) may be larger than the inner diameter of the second ring portion 15b and the minimum inner diameter of the second tapered portion 15d. Therefore, during the process of assembling the components, the outer diameter of the rear extension portion 111e may be primarily decreased by the second ring portion 15b and the second tapered portion 15d. Therefore, the protruding inner diameter of the protruding end of the auxiliary inner protruding portion 116 may be decreased primarily. However, as described above, in the state in which the components are completely assembled, the protruding inner diameter of the auxiliary inner protruding portion 116 may be an inner diameter decreased so that the auxiliary inner protruding portion 116 does not interfere with the outer peripheral surface of the pipe end. In addition, in the state in which the components are completely assembled, the protruding outer diameter of the protruding end of the rear outer protruding portion 114 (the maximum outer diameter of the rear extension portion 111e) may be larger than the inner diameter of the first ring portion 15a and a minimum inner diameter of the first tapered portion 15c. Therefore, during the swaging process, the outer diameter of the rear extension portion 111e (the rear outer protruding portion 114) may be decreased as the rear extension portion 111e (the rear outer protruding portion 114) is pressed by the first ring portion 15b and the first tapered portion 15c. Therefore, in the initial state in which the auxiliary inner protruding portion 116 does not interfere with the outer peripheral surface of the pipe end, the auxiliary inner protruding portion 116 may be deformed by the axial compressive force applied by the first tapered portion 15c or the first ring portion 15a by the swaging process into the state in which the auxiliary inner protruding portion 116 comes into contact with or presses the outer peripheral surface of the pipe end.

In addition, the auxiliary inner protruding portion 116 is pressed outward by the outer peripheral surface of the pipe end that is at least partially deformed elastically after the swaging ring 15 passes the outer peripheral surface of the pipe end, such that in the swaging completion state, the rear outer protruding portion 114 may further protrude outward than the inner peripheral surface of the first ring portion 15a. As described above, during the swaging process, the auxiliary inner protruding portion 116 may come into contact with or press the pipe end, such that the pipe end may be pressed inward. Therefore, because the external force, which presses the pipe end inward, is eliminated after the swaging ring 15 passes the pipe end, at least a part of the pipe end may be elastically deformed outward, and the auxiliary inner protruding portion 116 may be pressed outward by the elastic deformation of the pipe end. Therefore, in the swaging completion state, the rear outer protruding portion 114 may protrude outward so that the outer diameter of the rear outer protruding portion 114 is larger than the inner diameter of the first ring portion 15a of the swaging ring 15. Therefore, it is possible to further improve the effect of preventing the separation of the swaging ring 15 in the swaging completion state.

That is, according to the present pipe connection apparatus, the auxiliary inner protruding portion 116 protrudes inward less than the first inner protruding portion 112 (the protruding inner diameter of the auxiliary inner protruding portion 116 may be smaller than the protruding inner diameter of the first inner protruding portion 112), such that in the state in which the components are completely assembled, the auxiliary inner protruding portion 116 does not interfere with the pipe end. The auxiliary inner protruding portion 116 is elastically restored by being pressed outward by the outward elastic restoration of the pipe end, which has been pressed, when the swaging ring 15 passes the rear outer protruding portion 114 during the swaging process (a process to a swaging completion step in the state in which the components are completely assembled), such that the rear outer protruding portion 114 may further protrude outward than the first ring portion 15a of the swaging ring 15. Therefore, it is possible to further prevent the swaging ring 15 from being separated rearward (the rear outer protruding portion 114 serves as a catching projection in respect to the rear end of the swaging ring 15). In addition, the catching projection function of the rear outer protruding portion 114 may be organically combined with the restriction projection portion 111f to prevent the swaging ring 15 from being separated in the forward/rearward direction, thereby increasing a fastening force between the swaging ring 15 and the outer body 11.

In addition, referring to FIG. 3, in the state in which the components are completely assembled, at least a part of the inner peripheral surface of the second ring portion 15b may have a predetermined outer diameter in the forward/rearward direction, and at least a part of the outer peripheral surface of the first swaged portion 111a may have a predetermined outer diameter in the forward/rearward direction, such that the inner peripheral surface of the second ring portion 15b and the outer peripheral surface of the first swaged portion 111a are in surface contact with each other. In other words, a flat (flat in the forward/rearward direction) curved surface is formed at a front side (the second ring portion 15b) of the inner groove portion 15e of the swaging ring 15, and a flat curved surface is formed at a front side (the first swaged portion 111a) of the rear outer protruding portion 114 of the outer body 11. Therefore, the flat curved surface (at least a part of the second ring portion 15b) at the front side of the inner groove portion 15e of the swaging ring 15 and the flat curved surface (at least a part of the first swaged portion 111a) of the rear outer protruding portion 114 of the outer body 11 are in (surface) contact with each other, thereby preventing the occurrence of separation force caused by contact between inclined surfaces.

In addition, the flat curved surface (the second ring portion 15b) at the front side of the inner groove portion 15e of the swaging ring 15 is in contact with the second swaged portion 111b in the swaging completion state, such that it is possible to prevent the occurrence of separation force caused by contact between inclined surfaces even in the swaging completion state. In this case, during the swaging process or in the swaging completion state, the second swaged portion 111b may be deformed to have a flat curved surface by being pressed by the second ring portion 15b and come into surface contact with the flat curved surface (the second ring portion 15b) at the front side of the inner groove portion 15e of the swaging ring 15.

In addition, referring to FIG. 4, in the swaging completion state, at least a part of the inner peripheral surface of the first ring portion 15a may have a predetermined outer diameter in the forward/rearward direction, and at least a part of the outer peripheral surface of the first swaged portion 111a may have a predetermined outer diameter in the forward/rearward direction, such that the inner peripheral surface of the first ring portion 15a and the outer peripheral surface of the first swaged portion 111a are in surface contact with each other. In other words, a cross-section of at least a part of the inner peripheral surface of the first ring portion 15a may be formed linearly (to be flat in the forward/rearward direction), and a cross-section of at least a part of the outer peripheral surface of the first swaged portion 111a may be formed linearly. Therefore, in the swaging completion state, at least a part of the inner peripheral surface of the first ring portion 15a and at least a part of the outer peripheral surface of the first swaged portion 111a may be in surface contact with each other. Therefore, it is possible to prevent the occurrence of separation force caused by contact between inclined surfaces.

In addition, the first inner protruding portion 112 may be pressed by a portion of the first ring portion 111a, which has a predetermined outer diameter in the forward/rearward direction, in the swaging completion state. That is, in the swaging completion state, the first inner protruding portion 112 may be pressed by the flat portion, which may reduce the action of separation force.

According to the above-mentioned description, the force required for the assembling process may be reduced, the productivity may be improved, the equipment required for the assembling process may be simplified, and the product costs may be reduced in comparison with the previous patent application (Korean Patent No. 10-2137995) that was filed by the inventor of the present application and discloses that the process of assembling the components is performed by plastically deforming the components during the process of assembling the components.

In addition, according to the above-mentioned description, in the state in which the components are completely assembled, the swaging ring 15 may be rotated in a circumferential direction of the outer body 11 along the outer body 11 by adjusting the assembling tolerance of the rear outer protruding portion 114 and the inner groove portion 15e, such that the swaging ring 15 may be assembled in a direction in which a user may conveniently identify product information marked on an outer surface of a product. As necessary, the swaging ring 15 may be fixed to the outer body 111 without being rotated.

In addition, according to the above-mentioned description, an actively swaged volume may be reduced, such that a force required for the swaging process is reduced, and a weight of an exclusive fastening tool may be reduced in comparison with the previous patent application (Korean Patent No. 10-2137995) filed by the inventor of the present application.

In addition, according to the above-mentioned description, in the previous patent application (Korean Patent No. 10-2137995) filed by the inventor of the present application, the components are assembled by plastically deforming the components. For this reason, the stress of the elastic region, which remains after the plastic deformation, is applied between the inclined surface of the swaging ring 15 and the inclined surface of the outer body 11, which may cause the separation of the swaging ring 15. In addition, according to the above-mentioned context, the stress, which may separate the swaging ring 15, may be generated by the contact between the inner surface of the swaging ring 15 and the outer surface of the outer body 11 after the swaging is completed. Therefore, in the state in which the components are completely assembled and the swaging completion state, the swaging ring 15 and the outer body 11 are fixed by the frictional force, but it may be necessary to reduce a likelihood of separation of the swaging ring 15 by mitigating inclined shapes of the swaging ring 15 and the outer body 11 (reducing contact).

According to the above-mentioned description, in the state in which the components are completely assembled, the inner groove portion 15e and the rear outer protruding portion 114 engage with each other, such that the coupling force between the swaging ring 15 and the outer body 11 may be increased in the state in which the components are completely assembled. Further, because the contact between the second tapered portion 15d and the outer body 11 is eliminated by the first groove portion 118 in the state in which the components are completely assembled, it is possible to reduce or prevent the occurrence of separation force that separates the swaging ring 15 rearward in comparison with the previous patent application (Korean Patent No. 10-2137995) filed by the inventor of the present application.

In addition, in the swaging completion state, the contact between the first tapered portion 15c and the outer body 11 is eliminated by the first groove portion 118, and the contact between the second tapered portion 15d and the outer body 11 is eliminated by the second groove portion 119. Therefore, it is possible to reduce or prevent the occurrence of separation force that separates the swaging ring 15 rearward in comparison with the previous patent application (Korean Patent No. 10-2137995) filed by the inventor of the present application.

As described above, after the swaging is completed, the contact between the outer surface of the outer body 11 and the inner surface of the swaging ring 15 in the direction in which the swaging ring 15 is separated (e.g., the contact between the first tapered portion 15c and at least a part of the connection portion 111c by the first groove portion 118 and the contact between the second tapered portion 15d and at least a part of the front extension portion 111d (contact between inclined surfaces) by the second groove portion 119) is eliminated, such that an additional shape of the outer body 11 or a shape of the swaging ring 15 for preventing the separation of the swaging ring 15 is not required.

In addition, according to the above-mentioned description, during the process of assembling the components or after the components are completely assembled, the rear outer protruding portion 114 of the outer body 11, which is used to inhibit the separation of the swaging ring 15 (separation aspect), may be used to restrict the rearward movement (separation) of the swaging ring 15 even after the swaging is completed. It is possible to more actively prevent the separation of the swaging ring 15 and ensure high resistance against vibration and impact applied to the pipe 210 in comparison with the previous patent application (10-2018-0075259) filed by the inventor of the present application.

In addition, a flat (flat in the forward/rearward direction) curved surface is formed at a front side (the second ring portion 15b) of the inner groove portion 15e of the swaging ring 15, and a flat curved surface is formed at a front side (the first swaged portion 111a) of the rear outer protruding portion 114 of the outer body 11. Therefore, the flat curved surface (at least a part of the second ring portion 15b) at the front side of the inner groove portion 15e of the swaging ring 15 and the flat curved surface (at least a part of the first swaged portion 111a) of the rear outer protruding portion 114 of the outer body 11 are in surface contact with each other, thereby preventing the occurrence of separation force caused by contact between inclined surfaces and increasing the coupling force.

In addition, the flat curved surface (the second ring portion 15b) at the front side of the inner groove portion 15e of the swaging ring 15 is in contact with the second swaged portion 111b in the swaging completion state, such that it is possible to prevent the occurrence of separation force caused by contact between inclined surfaces and increase the coupling force even in the swaging completion state.

In addition, according to the above-mentioned description, in the swaging completion state, the rear outer protruding portion 114 may be provided in the form of a catching projection and fastened by being caught by a rear end of the swaging ring 15, and the front end of the swaging ring 15 comes into contact with a vertical surface of the outer body 11 (the vertical surface of the restriction projection portion 111o, which makes it possible to more securely maintain the swaging completion state.

In addition, according to the above-mentioned description, the outer diameters of the first swaged portion 111a and the second swaged portion 111b of the outer body 11 may be determined on the basis of the thicknesses of the first swaged portion 111a and the second swaged portion 111b that allow appropriate mechanical coupling (fastening) with the pipe after the swaging is completed. In addition, the thickness of the swaging ring 15 may be determined on the basis of the thickness of the swaging ring 15 that may sufficiently maintain the contact stress between the outer body 11 and the pipe 210.

In addition, referring to FIGS. 3 and 4, a stopper protrusion (no reference numeral) may be provided on the inner surface of the front end of the outer body 11 and formed in the circumferential direction of the outer body 11. The stopper protrusion may protrude toward the inside of the outer body 11 and restrict the forward movement of the pipe 210.

In addition, although not illustrated in the drawings, the outer body 11 may include another pipe mount part into which an end of another pipe is inserted in another direction. Another pipe mount part may include a pipe insertion space opened in a direction in which another pipe is inserted. For example, in case that another pipe is inserted from the front side, the pipe insertion space of another pipe mount part may be opened forward.

In addition, the present pipe connection apparatus may be formed in an elbow shape and connect the pipe 210 to another pipe disposed at an angle of 90° with respect to the pipe 210. Alternatively, the present pipe connection apparatus may be formed in a union tee shape and connect the pipe 210 to two other pipes. Even in this case, the pipe insertion spaces of the pipe mount part may be opened in the directions in which the other two pipes are inserted. Because the other pipe mount parts are identical and correspond to the above-mentioned pipe mount part 111, a detailed description thereof will be omitted. As described above, in the present pipe connection apparatus, the outer body 11 may be implemented (formed or manufactured) in various shapes, as necessary, to connect the pipe 210. For example, in case that the outer body 110 is implemented in an elbow (angled elbow) shape as described above, the present pipe connection apparatus may fasten the pipe 210 to another pipe at an angle of 90°. In case that the outer body 11 is implemented in a union tee (angled union tee) shape, the present pipe connection apparatus may fasten a branch pipe to the pipes 210, which are connected in series, and another pipe. In addition, the present pipe connection apparatus may include another swaging ring provided on another pipe mount part. Because another swaging ring is identical and corresponds to the above-mentioned swaging ring 15, a detailed description thereof will be omitted.

In addition, although not illustrated in the drawings, in the present pipe connection apparatus, the movement of the swaging ring 15 may be performed by a fastening tool. For example, the fastening tool may include a rear support unit configured to come into contact with a rear end surface of the swaging ring 15. In addition, the fastening tool may include a drive unit configured to provide driving power that relatively moves the rear support unit forward so that the swaging ring 15 moves from the rear side of the outer body 11 to a position at which the swaging ring 15 surrounds at least a part of the outer body 11. Further, the drive unit provides an axial compressive force generated by the driving power. In addition, a drive unit arrangement part, on which the drive unit is disposed, may be formed on an outer peripheral surface at a front side of the front extension portion 111d of the outer body 11. For example, the drive unit arrangement part may be formed to engage with a lower portion of the drive unit and restrict a rearward movement of the drive unit 23. For example, the above-mentioned restriction projection portion 111f may serve as the drive unit arrangement part.

That is, the drive unit arrangement part, which serves as a predetermined support part, is formed on the outer surface of the outer body 11 (the pipe mount part 111), such that the fastening tool may fasten the swaging ring 15 to the outer body 11 while supporting the rear side of the swaging ring 15 and the drive unit arrangement part on the outer surface of the outer body 11. In addition, the fastening tool may include a front support unit configured to come into contact with a front end surface of another swaging ring. Because the front support unit corresponds to the rear support unit 21, a detailed description thereof will be omitted. In addition, the present pipe connection apparatus may include the above-mentioned fastening tool.

According to the above-mentioned description, the present pipe connection apparatus may exhibit the following effects in respect to processing shapes.

According to the present pipe connection apparatus, the first groove portion 118 and the second groove portion 119 are formed in the outer surface of the outer body 11. Therefore, in comparison with a swaging-type pipe connection apparatus in the related art, the swaging may be performed with a small amount of force during the component assembling process of bringing the inner peripheral surface of the second ring portion 15b into contact with the first swaged portion 111a and during the swaging process of bringing the inner peripheral surface of the second ring portion 15b into contact with the outer peripheral surface of the second swaged portion 111b and bringing the inner peripheral surface of the first ring portion 15a into contact with the outer peripheral surface of the first swaged portion 111a. Therefore, it is possible to reduce energy consumed by the tool and reduce structural rigidity of the tool required to prevent deformation of the tool during the swaging process, such that a weight of the tool may also be reduced.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present invention. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

The invention claimed is:

1. A pipe connection apparatus comprising:
an outer body having a pipe mount part having a pipe insertion space opened rearward so that a pipe end is inserted into the pipe insertion space; and
a swaging ring configured to come into contact with and press at least a part of the pipe mount part while surrounding at least a part of the pipe mount part,
wherein the pipe mount part comprises:
a first swaged portion having a first inner protruding portion;
a second swaged portion having a second inner protruding portion and positioned to be spaced apart forward from the first swaged portion at an interval;
a connection portion configured to connect the first swaged portion and the second swaged portion;
a front extension portion extending forward from the second swaged portion; and
a rear extension portion extending rearward from the first swaged portion and having a rear outer protruding portion,
wherein the swaging ring comprises:
a first ring portion having a first ring inner diameter larger than an outer diameter of the pipe end;
a first tapered portion extending forward from a front end of the first ring portion so that an inner diameter thereof increases forward;
a second ring portion positioned forward of the first tapered portion and having a second ring inner diameter larger than the first ring inner diameter; and
a second tapered portion extending forward from a front end of the second ring portion so that an inner diameter thereof increases forward; and
an inner groove portion configured to connect the first tapered portion and the second ring portion and recessed outward further than a front end of the first tapered portion and a rear end of the second ring portion, and
wherein the inner groove portion engages with the rear outer protruding portion to restrict a rearward movement of the swaging ring in a state in which components are completely assembled so that an inner peripheral surface of the second ring portion is in contact with an outer peripheral surface of the first swaged portion, the components being the second ring portion and the first swaged portion.

2. The pipe connection apparatus of claim 1, wherein the swaging ring is provided so that the second tapered portion is not in contact with the outer body in the state in which the components are completely assembled.

3. The pipe connection apparatus of claim 2, wherein a first groove portion is formed in the connection portion,
wherein the first groove portion is recessed so as not to be in contact with the second tapered portion in the state in which the components are completely assembled, and
wherein the first groove portion is recessed so as not to be in contact with the first tapered portion in a swaging completion state in which an inner peripheral surface of the first ring portion is in contact with the outer peripheral surface of the first swaged portion and the inner peripheral surface of at least a part of the second ring portion is in contact with an outer peripheral surface of the second swaged portion.

4. The pipe connection apparatus of claim 2, wherein a second groove portion is formed in the front extension portion and recessed so as not to be in contact with the second tapered portion in a swaging completion state in which an inner peripheral surface of the first ring portion is in contact with the outer peripheral surface of the first swaged portion and the inner peripheral surface of at least a part of the second ring portion is in contact with an outer peripheral surface of the second swaged portion.

5. The pipe connection apparatus of claim 2, wherein the rear outer protruding portion is formed at a position that serves as a restriction projection that restricts a rearward movement of the swaging ring in a swaging completion state in which an inner peripheral surface of the first ring portion is in contact with the outer peripheral surface of the first swaged portion and the inner peripheral surface of at least a part of the second ring portion is in contact with an outer peripheral surface of the second swaged portion.

6. The pipe connection apparatus of claim 5, wherein the pipe mount part further comprises a restriction projection portion formed forward of the front extension portion and configured to restrict a forward movement of the swaging ring in the swaging completion state.

7. The pipe connection apparatus of claim 5, wherein the rear extension portion has an auxiliary inner protruding portion, and
wherein the auxiliary inner protruding portion is provided so that a protruding inner diameter of a protruding end of the auxiliary inner protruding portion is smaller than a protruding inner diameter of a protruding end of the first inner protruding portion in the state in which the components are completely assembled.

8. The pipe connection apparatus of claim 1, wherein an outer peripheral surface of the first ring portion has a predetermined outer diameter in a forward/rearward direction, and an inner peripheral surface of the first swaged portion has a predetermined outer diameter in the forward/rearward direction, such that an inner peripheral surface of the first ring portion and the outer peripheral surface of the first swaged portion are in surface contact with each other in a swaging completion state in which the inner peripheral surface of the first ring portion is in contact with the outer peripheral surface of the first swaged portion and the inner peripheral surface of at least a part of the second ring portion is in contact with an outer peripheral surface of the second swaged portion.

9. The pipe connection apparatus of claim 8, wherein the first inner protruding portion is pressed by a portion of the first ring portion, which has the predetermined outer diameter in the forward/rearward direction, in the swaging completion state.

\* \* \* \* \*